United States Patent [19]

Fodera et al.

[11] Patent Number: 5,328,131
[45] Date of Patent: Jul. 12, 1994

[54] VECTOR ROTARY WING ENSEMBLE

[76] Inventors: Vincent Fodera, 405 Pumpkin Way; Steven A. Black, 161 Coventry Dr., both of Henderson, Nev. 89015

[21] Appl. No.: 84,261
[22] PCT Filed: Jun. 4, 1992
[86] PCT No.: PCT/US92/04592
  § 371 Date: Jun. 12, 1993
  § 102(e) Date: Jun. 12, 1993
[87] PCT Pub. No.: WO93/24367
  PCT Pub. Date: Sep. 12, 1993
[51] Int. Cl.⁵ ..................... B64C 29/00; B64C 39/06
[52] U.S. Cl. ................... 244/12.2; 244/17.11; 244/73 B
[58] Field of Search ............... 244/12.2, 17.11, 23 C, 244/34 R, 73 R, 73 B, 73 C, 199

[56] References Cited

U.S. PATENT DOCUMENTS 2,728,537 12/1955 Elkins .
2,938,658 5/1960 Foster .
2,952,423 9/1960 Ellis .
3,041,010 6/1962 Foster .
3,104,853 9/1963 Klein .
5,102,066 4/1992 Daniel .

Primary Examiner—Galen L. Barefoot

[57] ABSTRACT

A system for producing vertical lift has a substantially rigid upper rotating disk (44) of dense solidity ratio whose discharge air flow is centrally routed via a vertical vortex shaft (24) to coact with lower coaxially rotating airfoil (34) and duct fan (36) elements. The upper disk (44) includes a spirally configured array of curved wings (40A–40D) which rotate in a first direction to produce lift and a cyclonic air discharge into an upper end of the vertical shaft (24). The lower rotating airfoil (34)/fan (36) elements are positioned at the lower end of the vertical shaft (24) and rotate in a counter direction to neutralize torques, induce downward air flow through the vertical shaft (24), and further provide lift and vertical thrust.

20 Claims, 4 Drawing Sheets

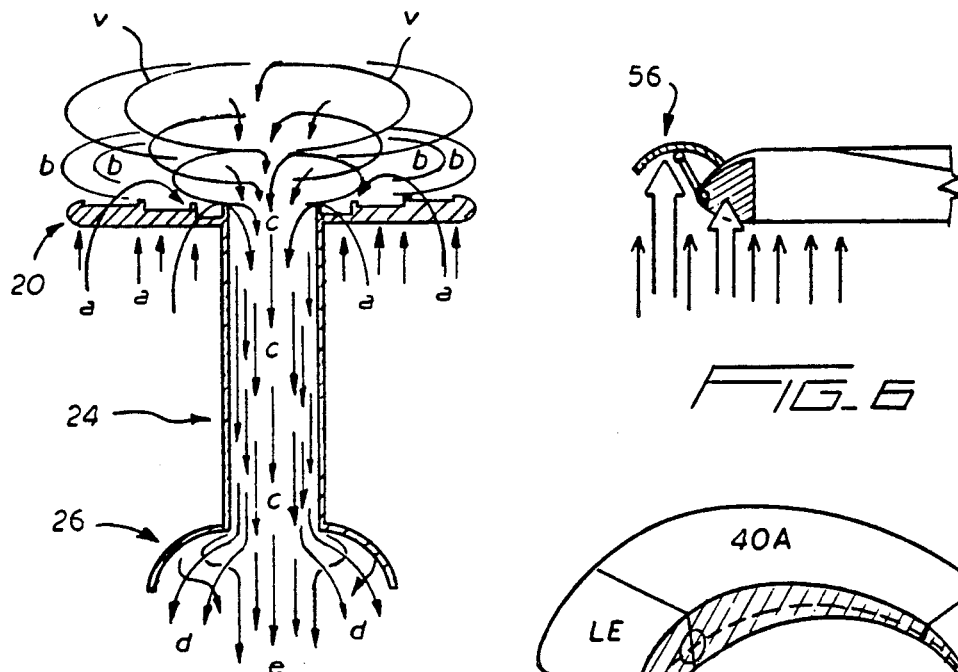
FIG. 3
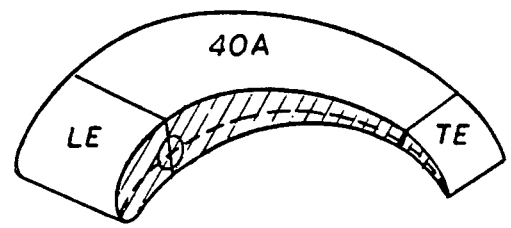
FIG. 6
FIG. 5
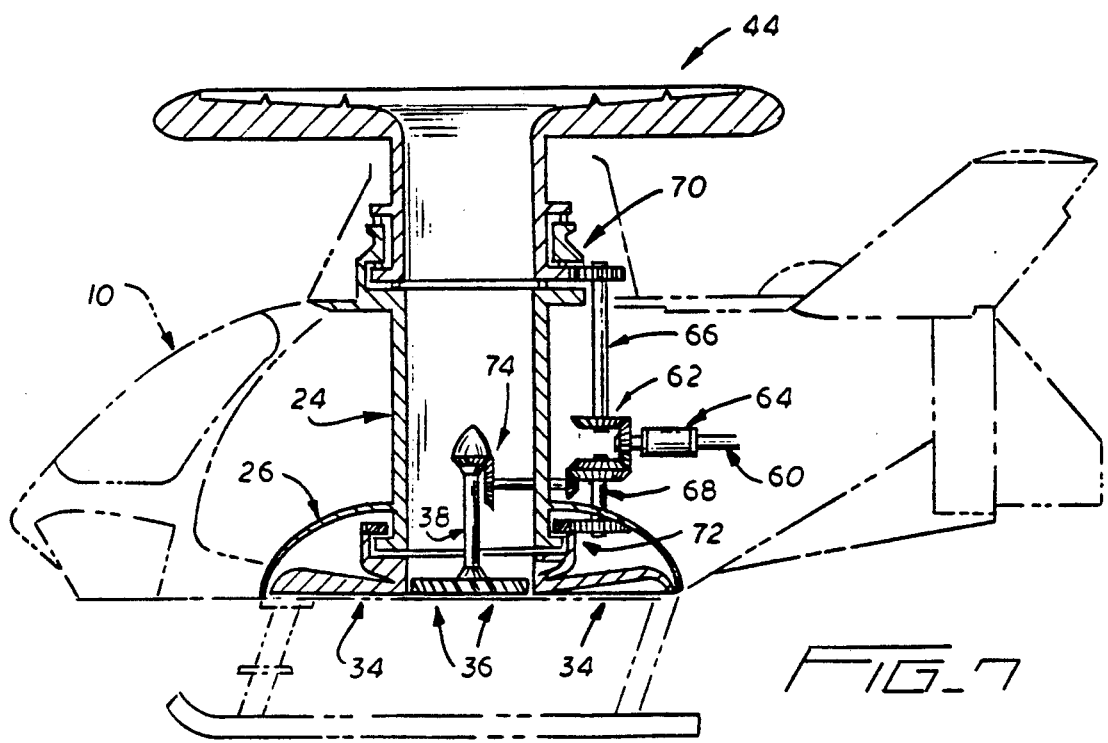
FIG. 7

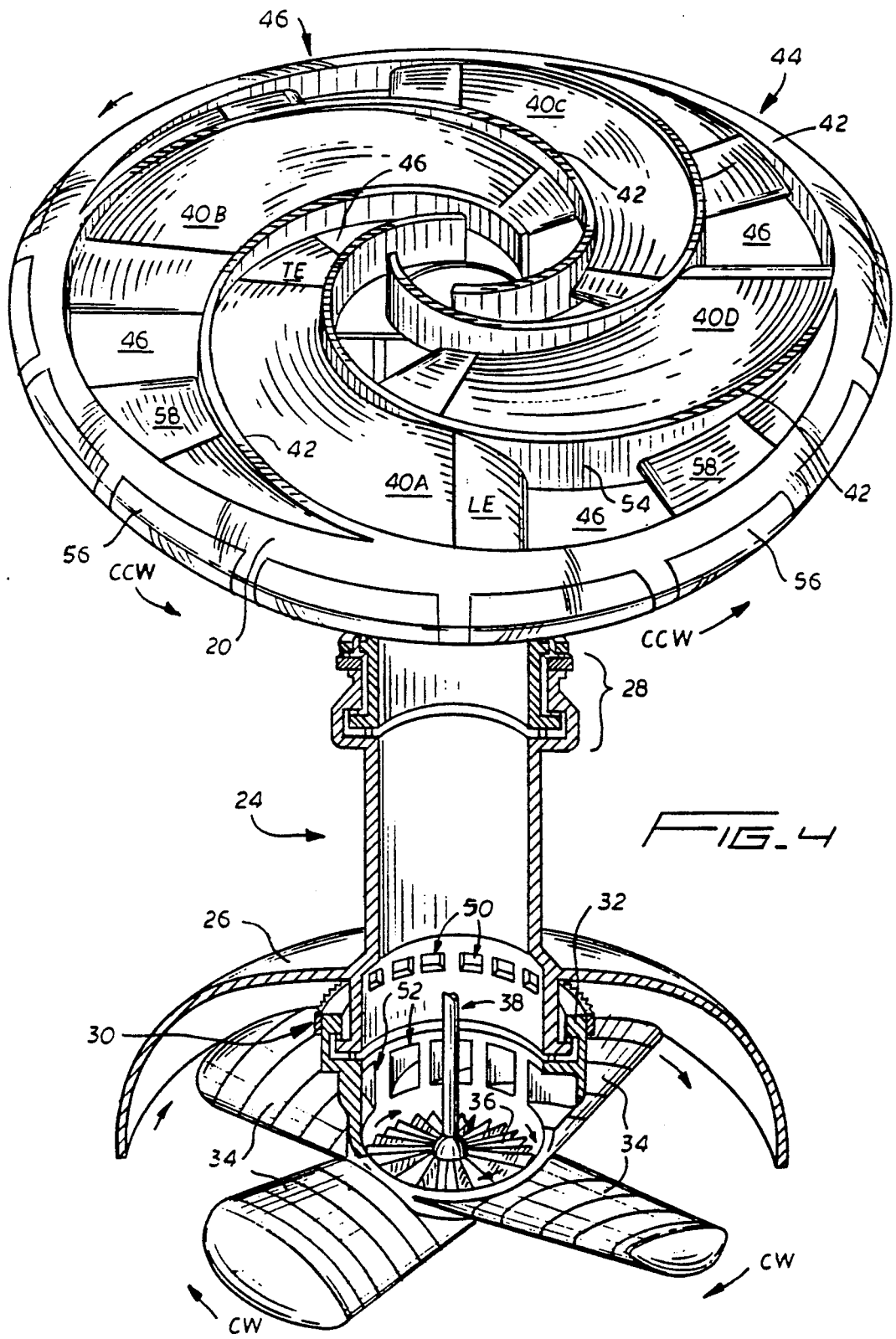
FIG_4

VECTOR ROTARY WING ENSEMBLE

TECHNICAL FIELD

The present invention relates generally to rotating aerodynamic elements for producing vertical lift, and more particularly to a compound vertical lift system having driven upper rotating elements and driven lower rotating elements which are interactively connected by air flow through a vertical vortex shaft. The compound vertical lift system is particularly suited for use in airborne vehicles, and utilizes a substantially rigid upper rotating disk of dense solidity ratio consisting of an array of spirally configured wing sections. When used in a VTOL aircraft, the present vertical lift system includes a vertical vortex shaft which passes centrally through the aircraft body.

BACKGROUND

Conventional VTOL/STOL aircraft employ a wide range of aerodynamic approaches to produce their needed vertical lift, forward speed, and stability while providing safe and efficient operation. Invariably, the technical compromises which result from meeting these diverse requirements produce operating aircraft having less than optimum characteristics in one or more important areas. The redeeming feature of air transportation is, of course, speed. However, in the case of helicopters this major advantage is fundamentally limited because of the technical factor of retreating blade stall. This involves the significant loss of lift by the retreating blade (the one turning toward the rear of the aircraft) due to vitiated relative wind, and places a practical upper limit on helicopter speeds.

Attempts to overcome some of the many design compromises of vertical lift systems for aircraft are well represented in the prior art. As a typical example, consider U.S. Pat. No. 4,598,887 to Jordan which discloses a rotary wing craft having two rotor blades for lift and a driven coaxial propeller (fan), both disposed above an essentially vertical air channel. In operation, the air stream generated by the propeller produces torque on guide vanes connected to the main blades, thereby driving the lifting blades.

U.S. Pat. No. 3,563,497 to Holmes discloses a rotorcraft which provides lift by means of a rotor element and a pair of counterrotating secondary rotors, wherein the rotor systems are axially aligned and allow for air flow between them via a vertical air passage. In operation, the thin rotor element may be driven to provide helicopter operation; may be freewheeling to provide autogyro operation; or may be stopped to provide fixed-wing-like operation.

In U.S. Pat. No. 3,103,327 to Parry there is disclosed a somewhat similar helicopter arrangement, including an upper 2-bladed rotor and a counterrotating lower propeller which combine to produce lift and thrust. Other earlier prior art approaches to more generalized vertical lift systems are found in U.S. Pat. Nos. 3,394,906 to Rogers (1966) and 2,980,365 to Yohe (1961).

Significant disadvantages of helicopter-like lift producing airfoils involve their typically low solidity ratios, and their low lift efficiencies for the portions of their airfoils nearest the hub. Solidity ratios (quantity of solid wing—or blade—area relative to the area swept out by the full length rotating elements) for smaller aircraft tend to be the lowest due to their use of two narrow blades. Regarding lift efficiencies, conventional rotary wing blades have maximum lift in the areas swept out by the outer blade lengths (the outer approximately 25 percent of area swept out), a median lift area in the centrally swept out areas, and a non-effective lift region in the area swept out by the shorter blade lengths. The vertical lift system approach taught in the present vector rotary wing ensemble (VRWE) invention admirably overcomes these and other disadvantages of the prior art approaches, and provides a significant improvement to the field of vertical aerodynamic lift.

OBJECTS OF THE INVENTION

It is therefore a primary object of the present invention to provide an improved system for producing lift which will overcome the disadvantages of the prior art approaches. A further object of the present invention is to provide an improved vertical lift system in the form of a vector rotary wing ensemble having an upper rotary disk of high solidity ratio.

A yet further object of the present invention is to provide an improved vertical lift system of the VRWE type adapted for use in airborne vehicles.

A still further object of the present invention is to provide a vector rotary wing ensemble for producing vertical lift for an aircraft, which includes an upper rotary disk of dense solidity ratio disposed above the aircraft body and driven in a first direction, which operates in combination with lower rotating elements disposed within the lower portion of the aircraft body, both of which interact via an essentially vertical air flow shaft within the aircraft.

A further object of the present invention is to provide two regions of vertical lift/thrust, one above the aircraft and the other at the lower vertical extremity of the aircraft.

In accordance with the present invention, there is provided a system for producing vertical lift by means of a rigid upper rotating disk of dense solidity ratio whose discharge air is induced to flow via a vertical vortex shaft coacting with lower rotating elements in the form of coaxially rotating wings and a duct fan. The upper disk is driven in a first direction to produce lift and a cyclonic air discharge into the vortex shaft, while the lower elements are driven in an opposite direction to neutralize any torque reaction upon the body of an asociated aircraft, as well as to induce downward air flow and also provide further lift and vertical thrust.

BRIEF DESCRIPTION OF THE DRAWINGS

Additional objects and advantages of the invention will become apparent to those skilled in the art as the description proceeds with reference to the accompanying drawings wherein:

FIG. 3 is a simplified schematic view of the air flow patterns produced by the vertical lift system;

FIG. 4 is a top perspective view, partly in section, of the vector rotary wing ensemble for producing lift, according to the present invention;

FIG. 5 is a top perspective view of a wing section for use with the top disk;

FIG. 6 is a partial cross-sectional view of a top disk rim flap in its deployed state;

FIG. 7 is a side elevational view, partially in section, showing an illustrative drive system for the upper and lower rotating elements of the vertical lift system;

BEST MODE FOR CARRYING OUT THE INVENTION

Figure 1:
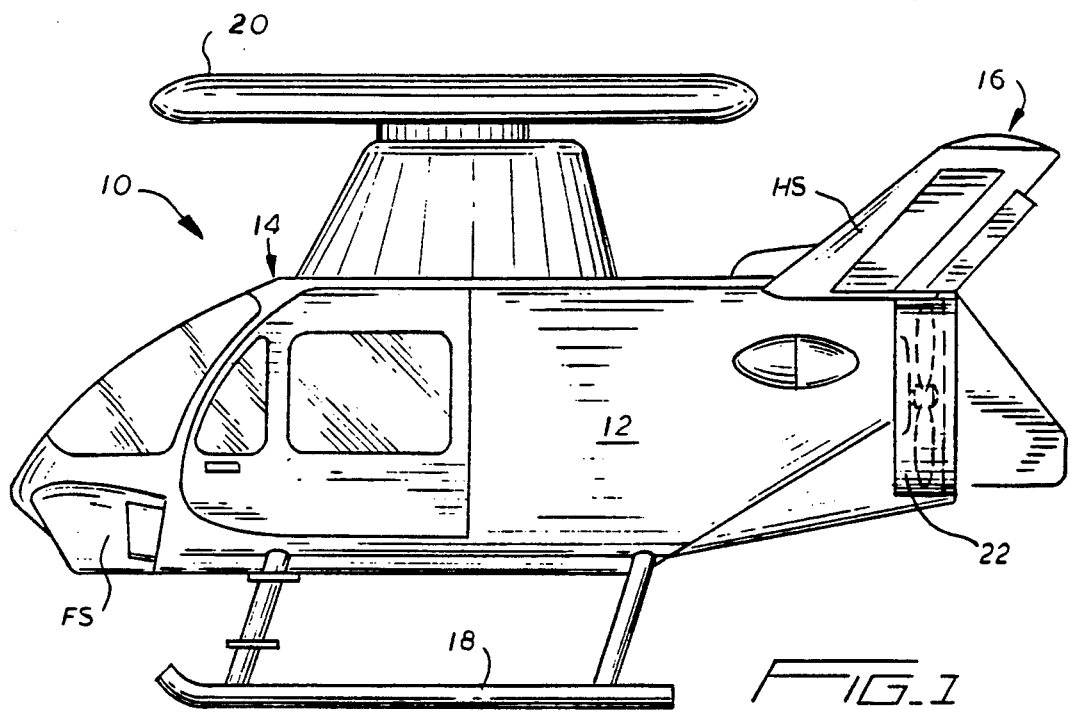
FIG. 1 is a side elevational view of an illustrative VTOL aircraft embodying the vertical lift system according to the present invention.

Referring now to FIG. 1, there is shown an illustrative aircraft embodying the vector rotary wing ensemble vertical lift system according to the present invention. Conventionally, the aircraft 10 includes a fuselage 12 having a cabin area 14, an empennage section 16, and helicopter-like landing skids 18 to accommodate the aircraft's VTOL capability. A circular deflector rim 20 encircles a top rotary disk (not shown) which contributes to the vertical lift of the aircraft 10, and a rear-mounted circular duct 22 encloses a horizontal thrust element, such as a propeller (shown in phantom), which may contribute to the forward motion of the aircraft 10. The forward motion producing means does not form part of the present invention, and the horizontal stabilizing means HS shown as part of the empennage section 16, as well as the forward auxiliary stabilizing means FS, are shown largely for illustrative purposes.

Figure 2:
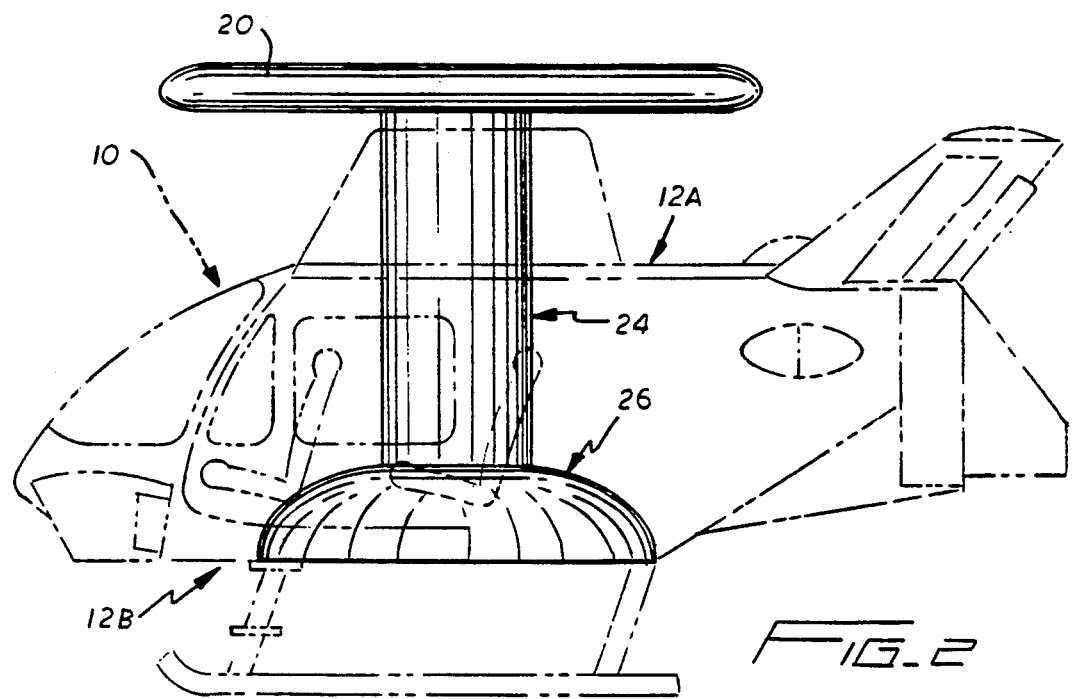
FIG. 2 is a side elevational view, partly in phantom, showing the three primary structures which contain and shape the vertical lift producing means as to taught in the present invention.

Brief reference to FIG. 2 provides an overall view of the three primary structures that contain and interactively shape the vertical lift system which provides the forces needed for ascent, descent, and hovering of the illustrative aircraft 10. For clarity, the three structures are shown in X-ray view, contrasted against the remainder of the aircraft 10 shown in phantom. Briefly, these are the deflector rim 20, which is axially aligned with the top of a vertical trunk or shaft 24, whose lower end is affixed to a rigid canopy shroud 26. The deflector rim 20 is positioned significantly above the upper skin 12A of the fuselage 12, while the lower extremity of the shroud 26 is nominally flush with the lower fuselage surface 12B.

By way of a brief functional overview, reference is made to the patterns of air flow within these three structures, as shown in simplified form in FIG. 3. The dynamic elements which create these air flows are described below in connection with the more detailed FIG. 4. By virtue of the combined results of both the upper and lower rotating elements, air flow is drawn upward, as depicted by the multiple arrows "a," experiencing a CCW cyclonic pattern as it moves into an area of reduced air pressure above the rotating elements depicted by the multiple arrows "b." By virtue of the lower rotating elements, the air at the core of the cyclonic pattern depicted by the multiple circular arrows "v" is drawn downward through the vertical shaft 24 as depicted by the multiple arrows "c," and propelled downward beneath the aircraft as depicted by the multiple arrows "d" and "e." In broad terms, the action of upper rotating elements combined with the action of lower rotating elements through the vertical vortex shaft produces the desired lift, while the counterrotating motions operate to substantially neutralize the torques involved.

The air flow patterns of FIG. 3 clearly show the two locations where lift occurs one above the other; the first location of vertical lift being above the aircraft, while the second location of vertical lift occurs at the lower vertical extremity of the aircraft.

Referring now to FIG. 4, there is shown a detailed view, partly in section, of the vector rotary wing ensemble which lies at the heart of the present invention. The ensemble produces controlled vertical lift by means of a plurality of rotating elements operating in combination with the three primary structures. As in FIG. 2, the deflector rim 20 is positioned above the vertical shaft 24 whose lower extremity transitions into the canopy shroud 26, with the upper rotating elements rotatably mounted to the shaft 24 via a suitably journaled rotary joint 28. The shaft 24 is fixed to the aircraft fuselage 12, and thus is stationary relative to the rotating elements. The lower extremity of the shaft 24 continues beyond the intersection carrying the shroud 26 to terminate in a second rotary joint 30 whose lower rotary hub portion 32 carries a set of four rotary wings 34. The wings 34 are contained within the envelope of the shroud 26, with their tips within the inner diameter of the shroud at its lowest and widest points, and their lower surfaces substantially flush with the lower shroud rim. In the center region of the rotary wings 34 there is located a duct fan 36 mounted to rotate coaxially with and in the same sense as the rotary wings 34 by means of a drive shaft 38. The rotary wings 34 and the duct fan 36 constitute the major lower CW rotating elements. The upper CCW rotating elements are contained within the envelope of the deflecting rim 20, and are basically configured as an array of curved wings 40A-40D (four, illustratively), each shaped to conform to a like number of spiral channels delineated by an array of spoke-like guide curbs 42. The four identical wings 40A-40D are formed with cross-sections for producing aerodynamic lift in the well-known manner, and include leading and trailing edge flaps which may be controllably articulated to produce the desired lift. For clarity of illustration, only the leading edge flap LE and trailing edge TE flap associated with the wing 40A are specifically labeled. Momentary reference to the perspective view of FIG. 5 shows the lifting airfoil cross-section, as well as the leading edge flap LE and trailing flap TE portions of the curved wing 40A.

Taken as a whole, this group of upper CCW rotating elements—including the deflector rim 20, the curved wings 40A-40D, the spiral guides 42, and other elements yet to be described—make up what will henceforth be designated, for simplicity, as the top disk 44. The two terms will be used interchangeably hereinafter. As shown, the outer extremities of the guide curbs 42 merge smoothly into the inner portion of the circular deflector rim 20, and the entire top disk 44 rotates about the stationary shaft 24 via the rotating joint 28. The rotation of the top disk 44 with its spiral walls forces air flow to swirl rapidly in a helical pattern; in combination, the lower duct fan 36 induces downward air flow from the core of the vortex. The combination of these two actions results in a diminished air pressure upon the topside surfaces of the four curved wings 40A-40D.

Eight openings 46 in the top disk 44 permit the passage of air between the bottomside and topside of the disk to support the air flow patterns shown with momentary reference back to FIG. 3. Four of these openings 46 are located directly in advance of the curved wings leading edges, and four of openings 46 are located directly rearward of their trailing edges; only one trailing edge opening is marked. For present purposes, the letters denoting the air flow direction arrows of FIG. 3 may be considered as also representing the areas or regions where those flows occur. The guide curbs 42 serve to control and force the topside air in region "b" to rotate in the direction of "v," thereby swirling it into an entrance hole 48 at the upper extremity of the vertical shaft 24. These vortex air currents pass down the shaft 24—in the region "c"—and arrive as input flow to the lower rotating elements within the shroud 26. Consider first the action of the duct fan 36, which may be driven at a rotational speed several times faster than that of the top disk 44, and draws topside air into the vortex flow as well as contributes to the thrust vector of all of the lower rotating elements. The portion of the downward air flow within shaft 24 acted on by this high-speed duct fan 36, is expelled vertically downward below its associated aircraft, producing the well-known upward thrust vector. Another portion of the downward air flow in shaft 24 is induced to flow via a circular array of vents 50 into the region acted on by the rotary wings 34. The vents 50 are controllably slatted (slats not shown) to permit a restricted passage of the vortex air current; the restricted flow preventing unwanted spilling back of air into the shaft 24 during certain descent operating modes. The wings 34 are shielded by the shroud 26 from relative wind when its associated aircraft is in forward flight, and when operating on part of the downward air flow they contribute to lift by both airfoil action and fan thrust action.

A number of ancillary features which contribute to the operating efficiency, as well as to the safety and stability of the vector rotary wing ensemble described above may be incorporated as improvements thereto. For efficiency, a circular array of air scoops 52 may be formed into the upper rim of the rotating hub 32 carrying the wings 34 to suck air off the top of the surface of the wings to enhance overall system lift; and air deflector fins 54 may be formed into the exposed vertical surfaces of the guide curbs 42 to dispell, via centrifugal force, a portion of swirling air molecules building up a laminar flow against the guide curb walls. Regarding safety and stability, a circumferential series of rim flaps 56 are conformally fitted into the outer surface of the deflector rim 20. These are hinged to open upward in the event of primary power failure to effectively broaden the top disk 44 diameter, thereby slowing speed of descent—as shown in the deployed state with momentary reference to FIG. 6. Additionally, a set of emergency flaps 58 positioned on a spiral section just ahead of the openings 46 may be articulated into an upward angle relative to the top disk 44 plane forcing the disk by ram air effect to continue rotation in the proper direction in the event of drive power failure.

An illustrative drive system for the rotating elements needed to implement the vertical lift capabilities of the present invention are shown in FIG. 7. For simplicity of exposition, the drive system is shown as made up of conventional shaft and gearing components (not to scale). Other well known drive components and approaches may, of course, be used. Basically, the drive system serves to drive the upper rotating elements—particularly the top disk 44—in a first direction (CCW in this case), and the lower rotating elements—primarily the rotary wings 34 and the duct fan 36—in the opposite (CW) direction. Beyond these counterrotating directions, the drive system is configured to operate the rotary elements in an appropriate range of speeds, at suitable power levels. As previously discussed, the air flow patterns established and maintained by these two levels of rotating elements pass through the vertical shaft 24, which is fixed to the fuselage of the aircraft 10. Both the upper CCW and lower CW rotations take place about a common vertical axis centered within the shaft 24.

The drive mechanisms and their associated controls (not shown) transmit primary shaft power from a prime mover (not shown) through an output shaft 60 to a set of primary bevel gears 62 via a free-wheeling mechanism 64. The bevel gears rotate an upper shaft 66 CW and a lower vertical shaft 68 CCW (all rotations as viewed from above). The upper drive shaft 66 rotates the top disk 44 CCW through an upper main gear/collar gear pair 70, and the lower drive shaft 68 rotates the hub portion 32 carrying the rotary wings 34 CW through a lower main gear/collar gear pair 72. Robust bearing and swashplate assemblies (not labeled) are incorporated within these three primary structures in the vicinity of the upper and lower collar gear pairs 70/72.

CCW rotation of the lower drive shaft 68 is coupled via a gear pair 74 to rotate the drive shaft 38 CW, thereby rotating the duct fan 36 in the same sense as the rotary wings 34. Advantageously, the duct fan 36 is driven at a rotational speed much higher than the top disk 44, in part to induce topside air flow downwardly into the shaft 24. In a preferred embodiment, the duct fan/top disk rotary speeds may be set at 10:1, illustratively. The rotational speeds of the other elements are both statically and dynamically set by gear ratios and by the control of input shaft 60 speed to meet the full range of drive system requirements.

Figure 8A:
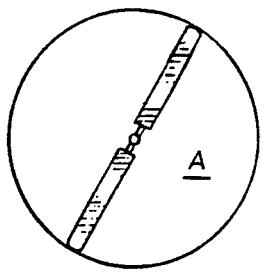
FIGS. 8A-SD show the relative solidity ratios of various rotating lift producing devices and a lift footprint of typical prior art systems.
Figure 8B:
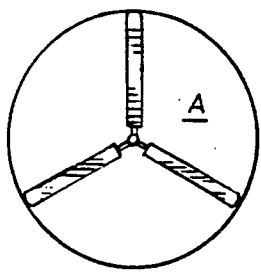
Figure 8D:
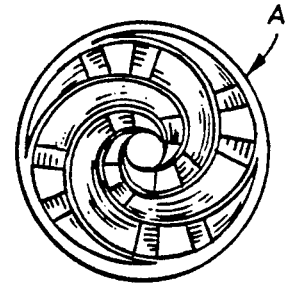
Figure 8C:
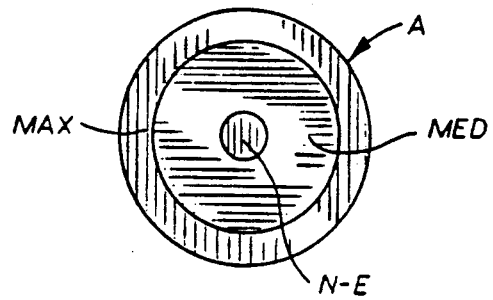
Figure 9A:
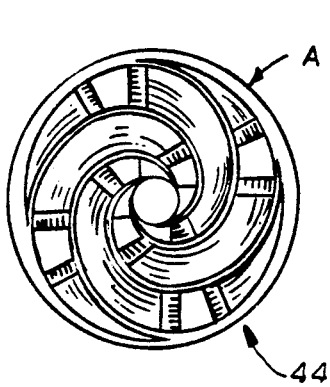
FIGS. 9A-9C show the lift footprint of the present vector rotary wing ensemble invention.
Figure 9B:
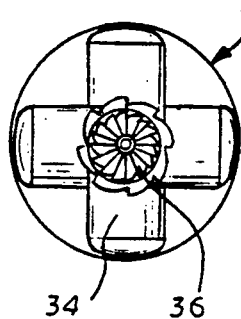
Figure 9C:
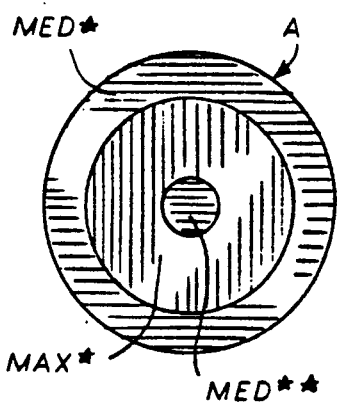

FIGS. 8A-8D illustrate the principle of solidity ratio in rotary lift producing devices, and FIGS. 9A-9C show how the lift/thrust actions combine to produce the high efficiency lift action of the VRWE.

FIGS. 8A and 8B show conventional two- and three-bladed rotors, respectively, commonly used in VTOL and STOL aircraft. In FIG. 8A only two blades sweep out a disc area A leading to a sparse solidity ratio, while FIG. 8B shows three blades sweeping out the same area A giving rise to a slightly denser solidity ratio. These types of rotors produce most of their lift within the outermost 25 percent (approximately) of their rotary disc as shown in FIG. 8C. FIGS. 8A-8C depict the same swept out rotor disc area A, and the two concentric circles of FIG. 8C delineate the corresponding lift magnitudes (again, only approximately) into three areas—two rings and a central core. A first maximum lift area MAX corresponds to the outermost ring, a median lift area MED corresponds to the inner ring, and a non-effective lift area N-E corresponds to the core. By way of contrast, see the plan view of the VRWE's upper disk in FIG. 8D which has the most wing and blade area within the same disk area A, thus providing the densest solidity ratio.

A primary effect of this very dense solidity ratio is graphically demonstrated with reference to FIGS. 9A-9C where the top disk 44 of FIG. 9A is nominally identical to that in the view of FIG. 8D. FIG. 9B shows a bottom plan view of the lower rotating elements, namely the rotary wings 34 and duct fan 36, as being coaxially housed within the rim of the shroud 26. FIGS. 9B and 9C are drawn approximately to scale with the top disk 44, and their resulting lift magnitude patterns are delineated (approximately) in FIG. 9C. As before, three distinct lift areas may be found, but with significantly advantageous differences. Due to the combined lift/thrust actions, the overall VRWE footprint has a median lift area in an outermost ring MED*, a maximum lift area in a middle ring MAX*, and a second median lift area in a central core MED**. Thus, the combined top disk 44, rotary wings 34, and duct fan 36—which combination is at the heart of the present invention—produces a lift pattern where all areas of its rotary components are effective in producing lift.

Beyond the significant lift efficiencies that accrue to the VRWE by virtue of the lift footprint considerations discussed above, several other major advantages are also provided. As previously mentioned, a serious limitation to forward speed in conventional helicopters is caused by retreating blade stall phenomena. In the present invention, this phenomena is largely avoided because the rim faring—the circular deflector rim 20—deflects the relative wind when its associated aircraft is in forward flight. This causes the 'bite' taken by the leading edge of the retreating curved wings (40A–40D) to be into the extant air pressure through the disk opening 46 directly in front of its leading edge.

A substantial amount of structural strength results from the top disk 44 spiral framework due to the physical arrangement of the components involved. Interconnection of the deflector rim 20 by both the spiral guide curbs 42 and the forward walls of the curved wings 40A–40D makes for a very robust unitary structure. Operating stress loads are distributed uniformly over all four quarters of the top disk 44, and the associated aircraft does not suffer dangerous vibration because the wing loads are distributed around a broad wide hub, in contrast to the narrow hubs found in conventional rotors. The rigid top disk 44 structure further substantially eliminates 'coning' found in more flexible rotor systems. Under heavy loads, excessive 'coning' can lead to dangerous operating conditions. And, of course, the physical strengths and rigidity of this unitary top disk 44 provide a good measure of immunity to minor blade-tip 'dings'—on the ground or in flight—which are often destructive to conventional rotor systems when in motion.

Additional benefits that serve to improve the efficiency of the VRWE taught in the present invention include elimination of the danger of supersonic tip speed rotation. In conventional rotor-wing aircraft, a dangerous vibration can cause the rotor blade to fracture and break away when the rotational tip speed of the blade—combined with air speed of the helicopter—exceeds the speed of sound. This cannot happen to the VRWE, as all of the components of the top disk 44 are contiguous and are shielded by the encircling rim fairing.

Although the invention has been described in terms of selected preferred embodiments, the invention should not be deemed limited thereto, since other embodiments and modifications will readily occur to one skilled in the art. It is therefore to be understood that the appended claims are intended to cover all such modifications as fall within the true spirit and scope of the invention.

We claim:

1. A system for producing lift comprising:
   (a) an upper rotating assembly of dense solidity ratio having a plurality of spirally-shaped lifting surfaces formed within a like plurality of radially disposed spiral guide elements;
   (b) lower rotating elements including a set of rotary wings arranged to rotate coaxially around a duct fan;
   (c) said lifting surfaces and said guide elements bounded at their outer extremities by a deflector rim forming the outer circumference of a unitary, disk-shaped upper rotating assembly, the inner extremities of said guide elements terminating at a central opening in said upper rotating assembly;
   (d) an essentially vertical cylindrical shaft having its upper opening adjacent said central opening and first and second lower openings, said first lower opening housing said duct fan;
   (e) a shroud affixed near the lower extremity of said shaft, said shroud having a diameter greater than that of said shaft and less than that of said deflector rim; and
   (f) said upper rotating assembly and lower rotating elements arranged to be coaxially rotatably mounted to and driven in first and second directions, respectively, around the relatively stationary vertical shaft and its affixed shroud.

2. The system for producing lift of claim 1 wherein said plurality of lifting surfaces each includes leading edge and trailing edge portions, and said upper rotating assembly further includes a like plurality of leading edge openings located rotationally in front of said leading edge portions and a like plurality of trailing edge openings located rotationally to the rear of said trailing edge portions;
   whereby upon rotation of said upper rotating assembly in said first direction lift air is drawn up through the leading edge openings, and further under the influence of said guide elements is converted into a vortex flow pattern while being inducted into said vertical shaft via said central and upper openings; and
   whereby upon rotation of said duct fan in said second direction a portion of said inducted air is accelerated and expelled downward via said first lower opening.

3. The system for producing lift of claim 2 wherein said rotary wings are arranged for rotation within said shroud and outwardly of said duct fan;
   whereby upon rotation of said rotary wings in said second direction, a portion of said inducted air is routed via said second lower opening to coact with said rotary wings to produce lift.

4. The system for producing lift of claim 3 wherein the upper rotating assembly is rotatably driven in a first direction and the lower rotating elements are rotatably driven in a second direction at absolute and relative rotational speeds which minimize the net torque of the overall system.

5. The system for producing lift of claim 4 wherein said first direction is counterclockwise and said second direction is clockwise.

6. The system for producing lift of claim 2 wherein said leading and trailing edge portions are collectively adjustable relative to their associated lifting surface whereby the resulting aggregate lift of said upper rotating assembly may be controllably adjusted.

7. The system for producing lift of claim 2 wherein the rotational speed of said duct fan is substantially higher than that of said rotating upper assembly.

8. The system for producing lift of claim 7 wherein the rotational speed of said duct fan is set at 10 times higher than that of said upper rotating assembly.

9. The system for producing lift of claim 3 wherein said second lower opening is of controllable size whereby the portion of said inducted air coacting with said rotary wings may be controllably adjusted.

10. The system for producing lift of claim 9 wherein said leading edge portions are collectively adjusted relative to their associated lifting surfaces whereby the net lift of said lift producing system is controllably adjusted.

11. A system for imparting controllable lift to an aircraft having a fuselage with a substantially horizontal upper surface and a lower belly surface, comprising:

(a) an upper rotating assembly of dense solidity ratio having a plurality of spirally-shaped lifting surfaces formed within a like plurality of radially disposed spiral guide elements, all disposed above said upper surface;

(b) lower rotating elements including a set of rotary wings arranged to rotate coaxially around a duct fan;

(c) said lifting surfaces and said guide elements bounded at their outer extremities by a deflector rim forming the purer circumference of a unitary, disk-shaped upper rotating assembly, the inner extremities of said guide elements terminating at a central opening in said upper rotating assembly;

(d) an essentially vertical cylindrical shaft having an upper portion disposed above said upper surface and a lower portion disposed wholly within said fuselage, said shaft further having an upper opening adjacent said central opening and first and second lower openings, said first lower opening housing said duct fan;

(e) a shroud rigidly affixed near the lower extremity of said shaft, said shroud having an open bottom with a circular rim which lies essentially flush with said lower surface, and said shroud further having a diameter greater than that of said shaft and less than that of said deflector rim; and (f) said upper rotating assembly and lower rotating elements arranged to be coaxially rotatably mounted to and driven in first and second directions, respectively, around the relatively stationary vertical shaft and its affixed shroud.

12. The system of claim 11 wherein said plurality of lifting surfaces each includes leading edge and trailing portions, said upper rotating assembly further including a like plurality of leading edge openings located rotationally in front of said leading edge portions and a like plurality of trailing edge openings located rotationally to the rear of said trailing edge portions;

whereby upon rotation of said upper rotating assembly in said first direction lift air is forced up through the leading and trailing edge openings and further under the influence of said guide elements is converted into a vortex flow pattern while being inducted into said vertical shaft via said central and upper openings; and whereby upon rotation of said duct fan in said second direction a portion of said inducted air is accelerated and expelled downward via said first lower opening.

13. The system of claim 12 wherein said rotary wings are arranged for rotation within said shroud and outwardly of said duct fan;

whereby upon rotation of said rotary wings in said second direction, a portion of said inducted air is routed via said second lower opening to coact with said rotary wings to produce lift.

14. The system of claim 13 wherein the upper rotating assembly is rotatably driven in a first direction and the lower rotating elements are rotatably driven in a second direction at absolute and relative rotational speeds which minimize the net torque of the overall lift system.

15. The system of claim 14 wherein said leading and trailing edge portions are collectively adjustable relative to their associated lifting surface whereby the resulting aggregate lift of said upper rotating assembly is controllably adjusted.

16. The system of claim 15 wherein said second lower opening is of controllable size whereby the portion of said inducted air coacting with said rotary wings is controllably adjusted, whereby the net lift of said system for imparting lift is adapted to provide an ascent mode with net positive lift, a descent mode with net negative lift, and a hover mode with substantially neutral lift.

17. The system of claim 16 wherein said aircraft is of the VTOL type.

18. The system of claim 17 wherein said aircraft is of the STOL type.

19. The system of claim 18 wherein the rotational speed of said duct fan is substantially higher than that of said upper rotational assembly.

20. The system of claim 19 wherein said first direction is counterclockwise, said second direction is clockwise, and said fuselage further includes prime mover and control means for rotatably driving said upper rotating assembly and said lower rotating elements.

* * * * *